R. B. LOVE.
AUTOMOBILE SAFETY DEVICE.
APPLICATION FILED MAR. 19, 1909.
947,112.
Patented Jan. 18, 1910.
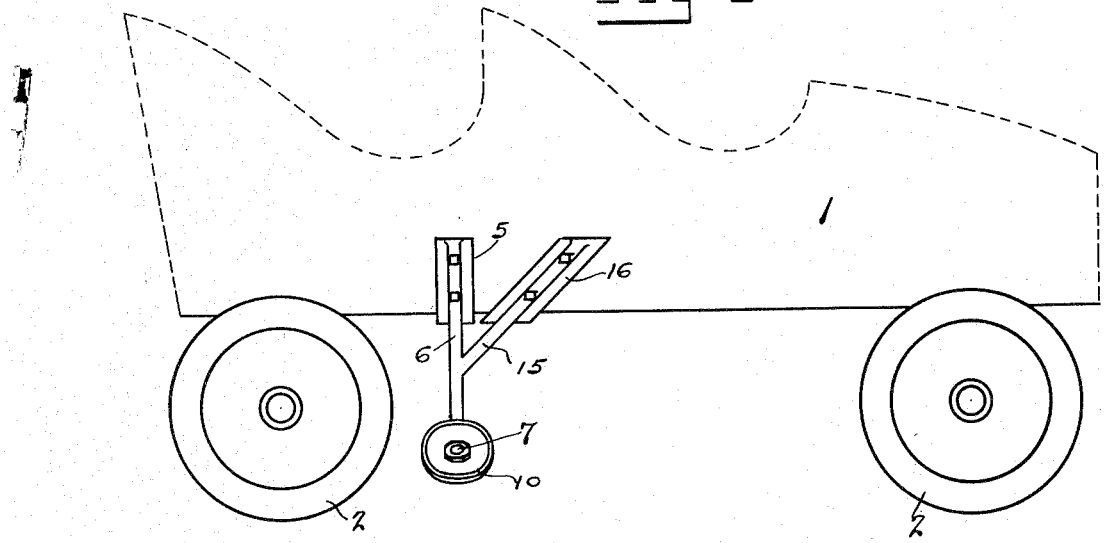
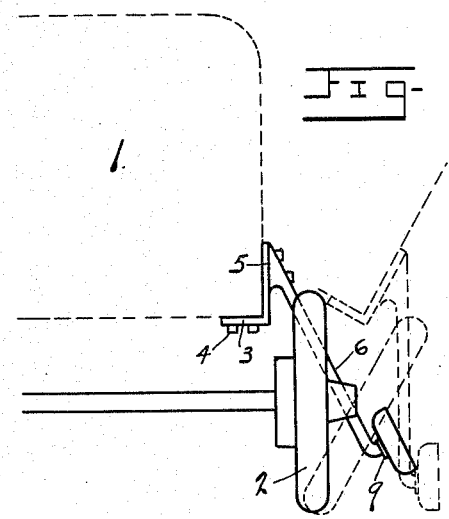
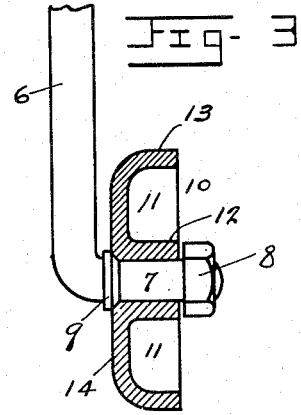
WITNESSES:
INVENTOR
Robert B. Love
BY
ATTORNEY.

UNITED STATES PATENT OFFICE.

ROBERT B. LOVE, OF ANTIOCH, CALIFORNIA.

AUTOMOBILE SAFETY DEVICE.

947,112.     Specification of Letters Patent.     Patented Jan. 18, 1910.

Application filed March 19, 1909. Serial No. 484,531.

*To all whom it may concern:*

Be it known that I, ROBERT B. LOVE, a citizen of the United States, residing at Antioch, in the county of Contra Costa and State of California, have invented certain new and useful Improvements in Automobile Safety Devices, of which the following is a specification, reference being had therein to the accompanying drawing.

This invention relates to safety attachments for automobiles, and has specially in view a roller or wheel adapted for attachment to one side, or the sides, of the body of the vehicle and projecting at an angle therefrom so that it will contact with the road when the said body is careened, such for instance as when making a turn at high speed, so as to prevent the vehicle overturning.

It will be understood, of course, that the essential details of the invention necessary in carrying out the above generally stated objects of the invention are susceptible of modifications and structural changes, but one preferred and practical example of the same is shown in the accompanying drawings, wherein—

Figure 1 is a side elevation of the improved safety device showing the same attached to the body of a motor vehicle. Fig. 2 is a similar view as seen from the rear of a vehicle, also indicating by dotted lines the position of the safety attachment when the vehicle careens. Fig. 3 is a detail sectional view of the roller and its connection with the spindle of the safety device.

Referring to the accompanying drawings by numerals, 1 designates a conventional representation of the body of a motor vehicle and 2 designates the wheels therefor. The improved safety attachment is composed of an angular bracket the base 3 of which may have a detachable bolting engagement 4 with the bottom of the vehicle body and the vertical member 5 of which is held flush with the side of said body. A downwardly and outwardly inclined arm 6 projects from the vertical member of said bracket and projects outwardly beyond the wheels of said body, said arm being preferably rounded and having its end portion turned upwardly at right angles to form a spindle 7 the outer end of which is threaded for the reception of a lock nut 8, the other or inner end of said spindle being provided with a beveled collar 9 between which and said nut 8, a wheel or roller 10 is retained on said spindle.

The wheel or roller 10 may be formed of cast or other metal or may be a simple wooden roller, but preferably the same is of metal the exterior of which is concaved as indicated at 11 and provided with a central integral hub 12. The tread surface 13 is rounded at its rear edge and merges into the flat back 14. A wheel or roller of this type may be readily and cheaply molded or cast, as will be obvious.

A brace arm 15 diverges from the intermediate portion of the arm 6 and has its outer end secured to or integral with a bracket 16 secured to the side of the vehicle preferably slightly forward of the bracket carried by the said arm 6. Said bracket 16 may be of the angular type described in connection with the first mentioned bracket.

It will be seen from the foregoing that the improved safety device may be readily attached to the sides of a motor vehicle and retained in position to prevent the same overturning, and is therefore of especial value in connection with racing or other speed machines, and as the same is of light, but strong construction, it does not materially add to the weight of the vehicle.

What I claim as my invention is:—

A device of the character described comprising a pair of angular brackets adapted for engagement with sides and bottom of a vehicle body, an outwardly and downwardly inclined arm carried by one bracket and having its outer end bent to form an angular spindle, a brace rod carried by the other bracket and connecting with said arm, and a roller mounted upon said angular bracket.

In testimony whereof I hereunto affix my signature in presence of two witnesses.

ROBERT B. LOVE.

Witnesses:
F. P. SCHROEDER,
H. C. SCHROEDER.